United States Patent
Lee et al.

(10) Patent No.: US 11,306,671 B2
(45) Date of Patent: Apr. 19, 2022

(54) METHOD AND APPARATUS FOR CONTROLLING PART LOAD MODE ENGINE TORQUE

(71) Applicants: Hyundai Motor Company, Seoul (KR); Kia Motors Corporation, Seoul (KR)

(72) Inventors: Kyung Taek Lee, Seoul (KR); Gi Young Kwon, Seoul (KR); Dong Jun Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 331 days.

(21) Appl. No.: 16/694,505

(22) Filed: Nov. 25, 2019

(65) Prior Publication Data

US 2020/0370492 A1  Nov. 26, 2020

(30) Foreign Application Priority Data

May 23, 2019  (KR) .......................... 10-2019-0060898

(51) Int. Cl.
*F02D 41/04* (2006.01)
*B60L 58/12* (2019.01)
*F02M 26/49* (2016.01)
*F02D 41/22* (2006.01)
(Continued)

(52) U.S. Cl.
CPC .............. *F02D 41/04* (2013.01); *B60L 58/12* (2019.02); *B60W 10/06* (2013.01); *B60W 20/13* (2016.01); *F02D 41/222* (2013.01); *F02M 26/49* (2016.02); *B60W 2510/244* (2013.01); *B60W 2710/0666* (2013.01); *F02D 2200/023* (2013.01);
(Continued)

(58) Field of Classification Search
CPC ................... F02D 41/04; F02D 41/222; F02D 2200/0494; F02D 2200/503; F02D 2200/703; B60L 58/12; B60L 3/0023; B60W 10/06; B60W 20/13; B60W 2510/244; B60W 2710/066; F02M 26/49; B60K 2006/4825; B60K 6/48
See application file for complete search history.

(56) References Cited

U.S. PATENT DOCUMENTS

2007/0006572 A1* 1/2007 Yu .......................... F02D 41/021
60/285
2009/0260903 A1* 10/2009 Park ...................... B60W 10/08
180/65.21

(Continued)

FOREIGN PATENT DOCUMENTS

KR   20130064544 A   6/2013

*Primary Examiner* — George C Jin
(74) *Attorney, Agent, or Firm* — Mintz Levin Cohn Ferris Glovsky and Popeo, P.C.; Peter F. Corless (57) ABSTRACT

A method and apparatus for controlling part load mode engine torque are provided. The method includes setting a limitation of part load mode engine torque based on a current traveling environment and calculating a first engine torque variation in the basis of state information of a battery. When the first engine torque variation is calculated, a second engine torque variation is calculated based on a measured engine error amount. The limitation of part load mode engine torque is compensated based on the calculated first and second engine torque variations.

14 Claims, 8 Drawing Sheets

(51) Int. Cl.
 B60W 20/13 (2016.01)
 B60W 10/06 (2006.01)
(52) U.S. Cl.
 CPC ............... *F02D 2200/0414* (2013.01); *F02D 2200/503* (2013.01); *F02D 2200/703* (2013.01)

(56) References Cited

U.S. PATENT DOCUMENTS

| 2011/0005212 | A1* | 1/2011 | Matsushita | F02D 37/02 |
| | | | | 60/299 |
| 2017/0057485 | A1* | 3/2017 | Choi | B60W 10/08 |
| 2018/0087241 | A1* | 3/2018 | Hoshino | B60W 10/06 |

* cited by examiner

- comparison between after and before limitation of part load mode engine torque changes -

METHOD AND APPARATUS FOR CONTROLLING PART LOAD MODE ENGINE TORQUE

CROSS REFERENCE TO RELATED APPLICATION

The present application claims priority to Korean Patent Application No. 10-2019-0060898, filed May 23, 2019, the entire contents of which is incorporated herein for all purposes by this reference.

BACKGROUND

Field of the Invention

The present invention generally relates to method and apparatus for controlling part load mode engine torque, and more specifically, to method and apparatus for controlling part load mode engine torque and a preset limitation of part load mode engine torque is compensated based on state information of a battery and an engine error amount to prevent the battery from being discharged based on engine driving environment in the part load mode.

Description of the Related Art

Generally, a hybrid vehicle uses an engine and a driving motor as power sources, and the motor assists engine output through assisting when driving power is necessary, and performs charging when the driving power is low. A driving mode of the hybrid vehicle is divided into a part load mode and a full load mode based on degree of load during driving of the hybrid vehicle. Due to the characteristic of engine control, a maximum output torque (e.g., part load maximum output engine torque) exists in the part load mode, and when demand torque is further required, the engine adjusts an air-fuel ratio to increase by increasing fuel and enters in the full load mode that is a maximum output mode.

A purpose of the full load mode is to realize the maximum engine performance. In this mode, engine efficiency is reduced, and fuel consumption increases. As described above, in the part load mode, engine lambda satisfies 1 and improved combustion of the engine is possible, but in the full load mode, engine lambda is maintained at 0.8 to 0.9 and a flame speed is greater and thus, engine output is a highest. As a related art, logic has been provided in which a controller additionally sets a limitation of part load mode engine torque (e.g., engine torque in the engine part load mode) to a low value when the engine knocks, air intake temperature is high, and atmospheric pressure condition is low.

However, considering state information of the battery and an engine error amount, although it may be possible to actually set a high limitation as a torque limitation in a part load area, the set limitation of torque in the part load area is not compensated, and thus, a full load area increases. In addition, since the battery is over-discharged by setting the limitation of engine torque in the part load area without considering the state information of the battery, the battery may be over-discharged.

SUMMARY

Accordingly, the present invention provides a method and an apparatus for controlling part load mode engine torque which may compensate a limitation of part load mode engine torque based on state information of a battery and information of an engine error amount.

The present invention also provides the method and the apparatus for controlling part load mode engine torque which prevent the battery from being discharged by changing torque limitation based on the state information of the battery in the setting the limitation when the engine is driven in a part load mode. In addition, the present invention provides the method and apparatus for controlling part load mode engine torque which minimize deterioration of fuel efficiency due to an increase in the full load area by changing the torque limitation based on the engine error amount when the engine is driven in the part load mode.

The present invention is not limited to the objectives mentioned above, and unspecified objectives of the present invention may be understood with reference to the following description and the accompanying drawings. Additionally, the objectives of the present invention may be realized by the means and combinations thereof in the claims.

The method of controlling part load mode engine torque of the present invention may include: setting, by a controller, a limitation of part load mode engine torque based on current traveling environment; calculating, by the controller, a first engine torque variation based on state information of a battery; when the first engine torque variation is calculated, calculating, by the controller, a second engine torque variation based on a measured engine error amount; and compensating, by the controller, the limitation of part load mode engine torque based on the calculated first and second engine torque variations.

The calculating of the first engine torque variation may include: determining whether a battery state of charge (SOC) is less than a first reference value; when the battery SOC is less than the first reference value, determining, by the controller, whether driving energy per unit distance is greater than a second reference value; and when the driving energy per unit distance is greater than the second reference value, calculating, by the controller, the first engine torque variation that corresponds to the state information of the battery. In addition, when the battery SOC is equal to or greater than the first reference value or the driving energy per unit distance is equal to or less than the second reference value, the method may include setting, by the controller, the limitation of part load mode engine torque based on the current driving environment.

Additionally, the calculating of the second engine torque variation based on the measured engine error amount may include: determining, by the controller, whether an absolute value of a lambda error amount per unit distance is greater than a third reference value; when the absolute value of the lambda error amount per unit distance is greater than the third reference value, determining, by the controller, whether an absolute value of an exhaust gas recirculation (EGR) error amount per unit distance is greater than a fourth reference value; and when the absolute value of the EGR error amount per unit distance is greater than the fourth reference value, calculating, by the controller, the second engine torque variation, based on the engine error amount.

In addition, when the absolute value of the lambda error amount per unit distance is equal to or less than the third reference value or the absolute value of the EGR error amount per unit distance is equal to or less than the fourth reference value, the method includes compensating for the limitation of part load mode engine torque by the first engine torque variation. The limitation of part load mode engine torque may be set by considering at least one factor of engine knocking, an air intake temperature, an atmospheric pressure condition, and an oil temperature as the driving environment. The state information of the battery may include information which is measured using at least one of a battery SOC, an accumulation amount of a battery current value, and driving energy per unit distance.

The apparatus for controlling part load mode engine torque for a hybrid vehicle according to the present invention may include: a demand torque calculation unit configured to calculate a limitation of part load mode engine torque, based on vehicle driving environment; a torque compensation unit configured to compensate the limitation of part load mode engine torque by calculating the first engine torque variation based on the state information of the battery and calculating the second engine torque variation based on the engine error amount; and an engine control unit configured to set the limitation of part load mode engine torque compensated based on the calculated first and second torque variations as the limitation of engine drive torque to drive an engine of the vehicle.

In addition, when the battery SOC is less than a first reference value and driving energy per unit distance is greater than the second reference value, the torque compensation unit may be configured to calculate the first engine torque variation. The engine error amount may include at least one of the lambda error amount and the EGR error amount. When the lambda error amount is greater than the third reference value and the EGR error amount is greater than the fourth reference value, the torque compensation unit may be configured to calculate the second engine torque variation.

When the lambda error amount is equal to or less than the third reference value or the EGR error amount is equal to or less than the fourth reference value, the torque compensation unit may be configured to compensate for the limitation of part load mode engine torque by the first engine torque variation. The state information of the battery may include information which is measured using at least one of the battery SOC, the accumulation amount of the battery current value, and the driving energy per unit distance. The vehicle driving environment may include at least one factor of the engine knocking, the air intake temperature, the atmospheric pressure condition, and the oil temperature.

As described above, the present invention may achieve the following effects by the embodiment described above, configurations and combinations described below, and the use relationship described below. The present invention may compensate the limitation of part load mode engine torque based on the state information of the battery, to prevent battery discharge. In addition, the present invention may consider a compensation amount based on the engine error amount, and thus, driving fuel efficiency of the vehicle may be improved by performing the compensation corresponding to a fuel efficiency deterioration area caused by the driving in the part load mode.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, an exemplary embodiment of the present invention will be described in detail with reference to the accompanying drawings. Throughout the drawings, the same reference numerals will refer to the same or like parts.

The present invention may be embodied in various different forms, but the scope of the present invention should not be construed as limiting the exemplary embodiment described hereinbelow. The exemplary embodiment of the present invention is provided for allowing those skilled in the art to more clearly comprehend the present invention.

In addition, the terms "~part", "~unit", "module", "apparatus" and the like mean a unit for processing at least one function or operation, and may be implemented by a combination of hardware and/or software. Terms such as "first" and "second" may be used for explaining various constitutive elements, but the present invention should not be limited to the order of terms. In addition, a reference value is a value preset in a controller, and the value may be changed depending on the application environment and the condition.

A hybrid control unit 114, a demand torque calculation unit 111, and a torque compensation unit 112 of the present invention are subcomponents of the controller, and which may be interchangeably used with the controller. An engine error amount of the present invention refers to a difference with an ideal engine trace graph of an engine 310, and the engine error amount that will be described below refers to a difference between a lambda target value and a lambda actual value at each timing at which measurement is performed or at unit distance, and refers to an absolute value of difference between an EGR target value and an EGR actual value.

Figure 1:
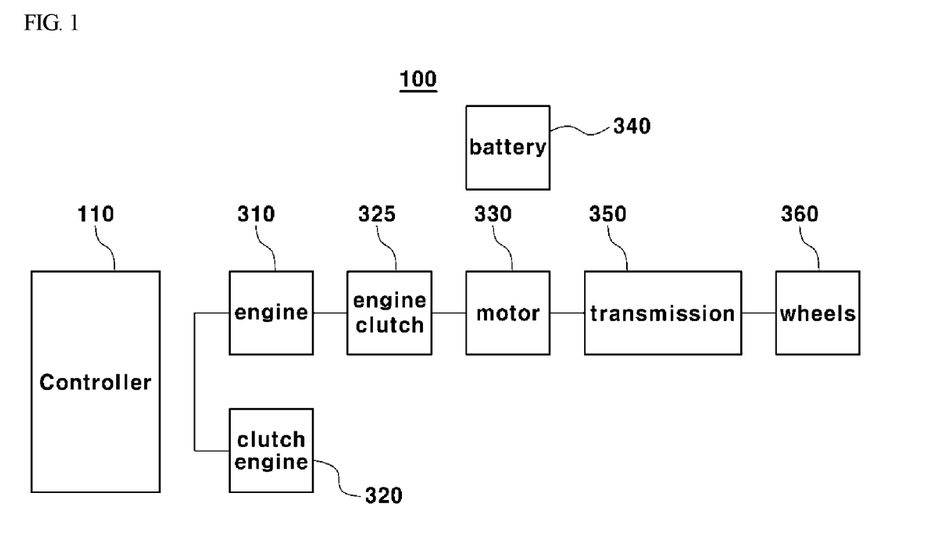
FIG. 1 is a block diagram showing an apparatus for controlling part load mode engine torque according to an exemplary embodiment of the present invention.

The present invention relates to a technique for compensating a limitation of part load mode engine torque that is set in a part load operation area of the engine 310 in a traveling environment of a hybrid vehicle 100. In particular, the present invention relates to method and apparatus for adjusting part load mode engine torque for the hybrid vehicle 100 including a power train of a transmission mounted electric device (TMED) type, as shown in FIG. 1. As shown in the drawings, the hybrid vehicle 100 includes an engine clutch 325 between the engine 310 and a motor 330 that forma power source, and thus the hybrid vehicle 100 provides two modes: an electric vehicle mode (an EV mode) that is a pure electric vehicle mode using power of the motor 330 based on whether the engine clutch 325 is in an engagement state; and a hybrid electric vehicle mode (a HEV mode) that is a mode using torque of the engine 310 as main power while using torque of the motor 330 as auxiliary power.

More specifically, in the hybrid vehicle 100 configured such that the motor 330 is directly connected to a transmission 350, engine revolutions per minute (RPM) may increase through activation of a hybrid starter generator (HSG) 320, power transmission and power cut-off of the engine 310 may be performed through engagement and disengagement of a clutch 325, a driving force may be generated on wheels 390 through a power delivery system which may include the transmission 350, and engine torque may be transmitted through engagement of the clutch 325 when torque transmission is required.

An exemplary embodiment of the present invention relates to method and apparatus for controlling part load mode engine torque, the apparatus may be configured to calculate the limitation of part load mode engine torque set based on driving environment in part load operation environment of the engine 310, and perform compensation for the calculated limitation of part load mode engine torque based on information of a battery 340 and the engine error amount.

Figure 2:
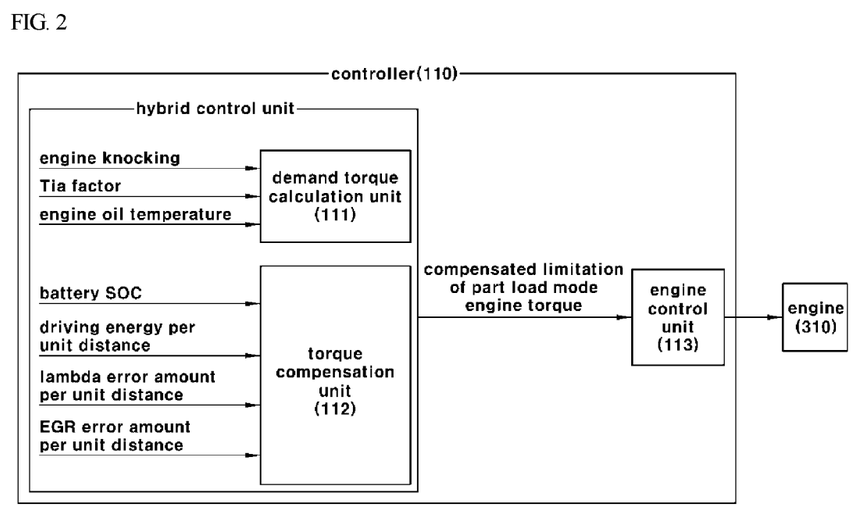
FIG. 2 is a diagram showing a configuration of a controller of the apparatus for controlling part load mode engine torque according to the exemplary embodiment of the present invention.

FIG. 2 is a diagram showing a configuration of a controller 110 of the apparatus for controlling part load mode engine torque according to the exemplary embodiment of the present invention. The controller 110 may include a hybrid control unit (HCU) 114, a motor control unit, (MCU, now shown), an engine control unit (ECU) 113, and a transmission control unit (TCU, not shown).

In particular, the hybrid control unit 114 may include the demand torque calculation unit 111 configured to calculate a limitation of part load mode engine torque based on traveling environment of the vehicle 100, the torque compensation unit 112 configured to calculate a first engine torque variation based on state information of the battery 340 and to calculate a second engine torque variation based on the engine error amount. In addition, the torque compensation unit 112 may be configured to compensate the limitation of part load mode engine torque calculated by the demand torque calculation unit 111 by the first and second engine torque variations. An engine control unit 113 may be configured to operate the engine 310, based on the limitation of part load mode engine torque compensated based on the torque variations which is calculated by the torque compensation unit 112 when the vehicle 100 is being driven in the engine part load area.

Additionally, the torque compensation unit 112 may be configured to calculate the first engine torque variation in advance and then calculate the second engine torque variation. The torque compensation unit 112 may also be configured to compensate the limitation of part load mode engine torque based on the calculated first and second engine torque variations. The first and second engine torque variations calculated by the torque compensation unit 112 may be calculated in a form of a map, based on data on the state information of the battery 340 and the engine error amount, and a data value of the calculated map may be configured to compensate the limitation of part load mode engine torque.

In the exemplary embodiment of the present invention, the torque compensation unit 112 may be configured to calculate the first engine torque variation by receiving the state information of the battery 340, based on information measured using at least one of a battery SOC (e.g., a SOC amount of the battery 340), an accumulation amount of a current value of the battery 340, and driving energy per unit distance. In addition, the torque compensation unit 112 may be configured to calculate the second engine torque variation by receiving a lambda measured value and an EGR driving value of the engine 310.

Particularly, in measuring the driving energy per unit distance, the torque compensation unit 112 may be configured to calculate the driving energy per unit distance by integrating driving demand power based on the unit distance and dividing the deriving demand power by traveling distance. In addition, the demand torque calculation unit 111 may be configured to receive a measurement value of at least one of engine knocking, an air intake temperature, an atmospheric pressure condition, and an oil temperature from an engine knocking sensor (not shown), an atmospheric pressure sensor (not shown), an oil temperature sensor (not shown), and an intake temperature sensor (not shown), and calculate the limitation of part load mode engine torque depending on the traveling environment of the vehicle 100.

Figure 3:
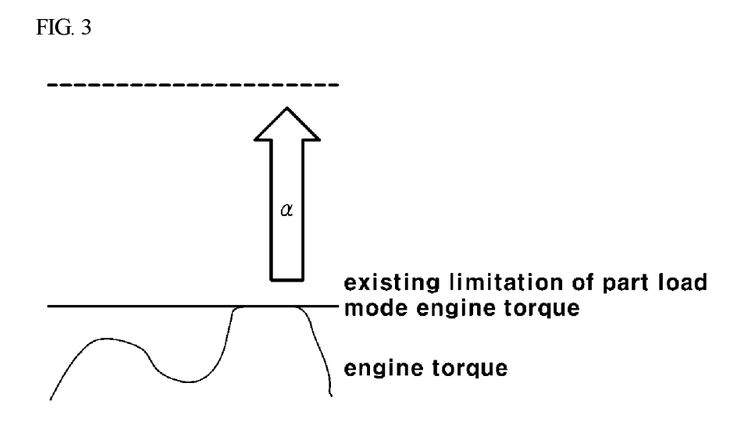
FIG. 3 is a graph showing a setting of a first engine torque variation according to the exemplary embodiment of the present invention.

FIG. 3 shows a limitation of part load mode engine torque obtained by calculating the first engine torque variation by the torque compensation unit 112 and compensating a limitation of part load mode engine torque calculated by the demand torque calculation unit 111. The demand torque calculation unit 111 may be configured to set the limitation of part load mode engine torque based on the traveling environment of the vehicle 100, and part load engine driving may be performed within the set limitation of part load mode engine torque.

As shown in the drawing, the limitation of part load mode engine torque set in consideration of the traveling environment may be compensated by the first engine torque variation which is calculated by the torque compensation unit 112 based on the state information of the battery 340. In particular, the torque compensation unit 112 may be configured to receive the state information of the battery 340 such as the battery SOC, the accumulation amount of the battery current value, and driving energy per unit distance, using a plurality of sensors (not shown) in the battery 340, and to compensate the limitation of part load mode engine torque set depending on initial traveling environment based on the received state information.

In the present invention, the controller 110 may be configured to determine whether the battery SOC, as the state information of the battery 340, is less than a first reference value preset in the controller 110. When the battery SOC is less than the first reference value, the controller 110 may be configured to determine whether the driving energy per unit distance is greater than a second reference value. When the battery SOC is less than the first reference value and the driving energy per unit distance is greater than the second reference value, the controller 110 may be configured to calculate the first engine torque variation.

Contrary, when the battery SOC is equal to or greater than the first reference value or the driving energy per unit distance is equal to or less than the second reference value, the controller 110 may be configured to set the limitation of part load mode engine torque allowing the engine 310 to be driven, depending on current traveling environment. Accordingly, the controller 110 may be configured to perform operation depending on the limitation of part load mode engine torque set based on the initial traveling environment without calculating the first engine torque variation for compensation.

When the battery SOC is equal to or greater than the first reference value, the controller 110 may be configured to perform the operation depending on the limitation of part load mode engine torque set based on the initial traveling environment without calculating the first engine torque variation for the compensation. However, when the battery SOC is less than the first reference value, the controller 110 may be configured to determine whether the driving energy per unit distance is greater than the second reference value.

The first engine torque variation is for calculating compensation amount to prevent the battery 340 from being over-discharged. Accordingly, when a risk of battery over-discharge is present based on the state information of the battery 340, the first engine torque variation is configured to reduce a discharge amount of the battery 340 by increasing the limitation of part load mode engine torque. In other words, the first engine torque variation compensates for the limitation of part load mode engine torque set based on the traveling environment to increase, and thus, the battery SOC may be prevented from being discharged. In addition, when the battery SOC is equal to or greater than the first reference value, the controller 110 may be configured not to calculate the first engine torque variation increasing the limitation of part load mode engine torque. Since a torque limitation may be set higher than an engine operation torque area of an optimum operation line (OOL) of the engine 310, efficiency of the engine 310 may be reduced.

Figure 4:
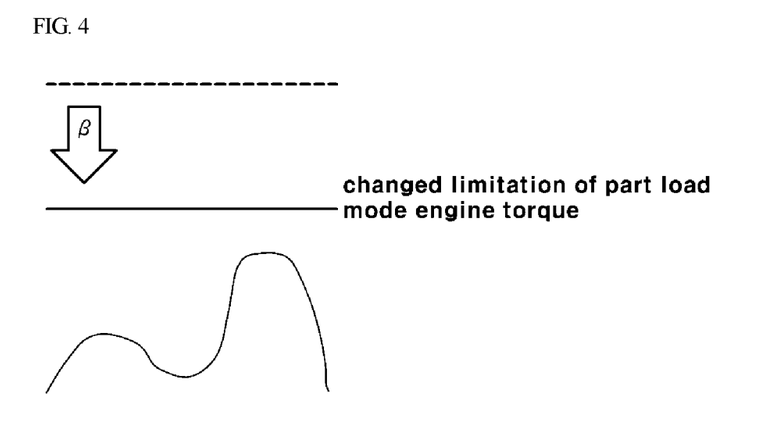
FIG. 4 is a graph showing a setting of a second engine torque variation according to the exemplary embodiment of the present invention.

FIG. 4 is a graph showing the limitation of part load mode engine torque compensated by the second engine torque variation calculated by the torque compensation unit 112 according to the present invention. As shown in the drawing, the second engine torque variation calculated by the torque compensation unit 112 is configured to adjust a limitation of part load mode engine torque to be less than the compensated limitation of part load mode engine torque by the first engine torque variation, based on the engine error amount.

In other words, as shown in FIGS. 3 and 4, the controller may be configured to adjust the limitation of part load mode engine torque to increase by using the first engine torque variation that is configured based on the state information of the battery 340 to compensate the limitation of part load mode engine torque set based on the traveling environment, and may be configured to adjust the limitation of part load mode engine torque to decrease using the second engine torque variation that is calculated based on the engine error amount.

The second engine torque variation may prevent a deterioration factor of fuel efficiency in the driving of the vehicle, as followability of a lambda target value and followability of an EGR target value are deteriorated based on the limitation of part load mode engine torque increasing by the first engine torque variation. In particular, in the present invention, when the lambda followability per unit distance is deteriorated (e.g., the lambda error amount per unit distance increases) or an EGR amount varies based on increasing of an air amount flowing into the engine 310 and EGR drivability (e.g., the EGR error amount per unit error increases), the torque compensation unit 112 may be configured to adjust the limitation of part load mode engine torque to be downwardly compensated by the second engine torque variation.

Figure 5:
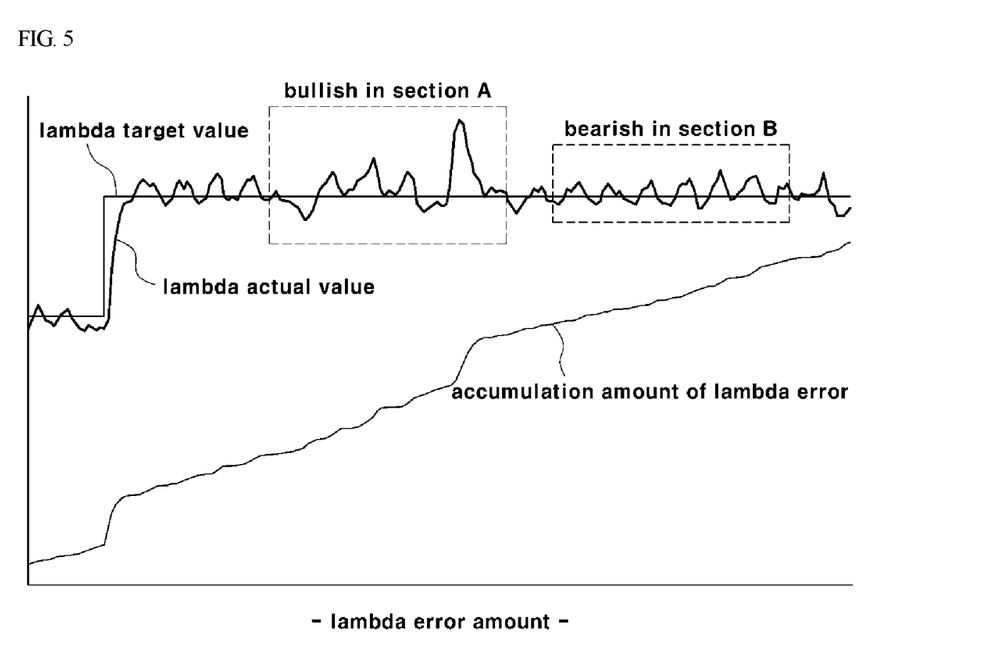
FIG. 5 is a graph showing an accumulation amount of a lambda error amount over traveling distance according to the exemplary embodiment of the present invention.
Figure 6:
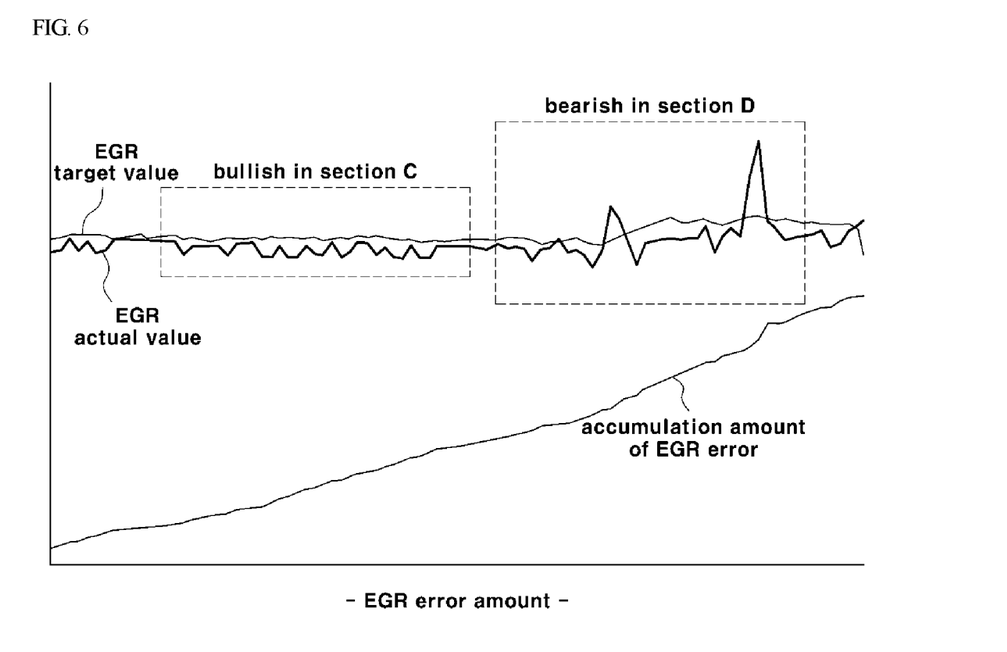
FIG. 6 is a graph showing an accumulation amount of an EGR error amount over traveling distance according to the exemplary embodiment of the present invention.

FIGS. 5 and 6 are graphs showing a process of determining the engine error amount by the torque compensation unit 112, based on the traveling distance. FIG. 5 shows a graph of comparing a tracking lambda target value of the engine 310 which has an ideal lambda value and is driven in the part load mode with a lambda actual value caused by actual driving.

As shown in FIG. 5, the set lambda target value is disclosed, preferably, lambda may have a target value of one, based on RPM of the engine 310 driven in the part load mode. In the present invention, the controller 110 may be configured to calculate the lambda error amount per unit distance and compare the lambda error amount with a preset third reference value in determining the lambda error amount. In addition, the lambda error amount per unit distance may be calculated by dividing an integral value of an absolute value of difference between the lambda target value per unit distance and the lambda actual value with the traveling distance.

Accordingly, in an section A, the controller may be configured to determine that the lambda error amount is relatively high as compared with the other traveling distance, and thus, the torque compensation unit 112 may be configured to calculate the second engine torque variation to perform compensation for the limitation of part load mode engine torque in the section A in which the lambda error amount greater than the third reference value is measured. On the other hand, the difference between the lambda target value and the lambda actual value may be determined to be relatively small in a section B. In this area, the lambda error amount is equal to or less than the third reference value, and compensation based on the second engine torque variation is not performed.

FIG. 6 is a graph of comparing the ideal EGR target value with the EGR actual value caused depending on the actual traveling or driving of the vehicle. As shown in FIG. 6, the torque compensation unit 112 may be configured to compare the ideal EGR target value initially set in consideration of the traveling environment with the EGR actual value caused by the actual traveling, and to calculate the EGR error amount through the difference.

In other words, EGR is an exhaust gas recirculation system which may reduce NOx, and may be applied to improve engine efficiency of the hybrid vehicle. A basic EGR value is determined based on an air intake amount and an engine RPM value, and a final target EGR value is determined by correcting conditions related to cooling water and atmospheric pressure. In other words, in the present invention, the final EGR target value refers to a reference value set by the controller based on a temperature of cooling water and atmospheric pressure based on the driving of the vehicle.

In addition, the EGR target value basically is an EGR flow rate having a modeling value, and a deviation of the EGR actual value from the set EGR target value may occur in a transient section in which engine torque is changed due to change of air amount. In other words, since the EGR is configured to allow exhaust gas to flow into an engine cylinder, when the EGR actual value differs from the EGR target value, engine combustion stability may be reduced. Therefore, the EGR error amount may be calculated to check the engine combustion stability based on a variation between the EGR target value and the EGR actual value.

In the exemplary embodiment of the present invention, the torque compensation unit 112 may be configured to integrate an absolute value of difference between the EGR target value and the EGR actual value per unit distance, and to divide the integral value by the traveling distance to calculate the EGR error amount. When the EGR error amount is greater than a fourth reference value preset by the torque compensation unit 112, the torque compensation unit 112 may be configured to calculate the second engine torque variation.

In particular, in the calculating the second engine torque variation, the torque compensation unit 112 may be configured to determine whether the lambda error amount is greater than the third reference value in advance, and when the lambda error amount is greater than the third reference value in advance and the EGR error amount is greater than the fourth reference value, the torque compensation unit 112 may be configured to calculate the second engine torque variation. When the lambda error amount is equal to or less than the third reference value or the EGR error amount is equal to or less than the fourth reference value, the torque compensation unit 112 may be configured to compensate the limitation of part load mode engine torque by the first engine torque variation calculated based on the battery 340.

When the lambda error amount is equal to or less than the third reference value, the torque compensation unit 112 may be configured to compensate the limitation of part load mode engine torque by the first engine torque variation. In addition, when the lambda error amount is greater than the third reference value and the EGR error amount is equal to or less than the fourth reference value, the torque compensation unit 112 may be configured to compensate the limitation of part load mode engine torque by the first engine torque variation. In other words, since the first engine torque variation is calculated in advance and then the second engine torque variation is calculated, the torque compensation unit 112 may be configured to compensate the limitation of part load mode engine torque calculated depending on the initial traveling environment, based on the first engine torque variation and the second engine torque variation calculated based on a specific condition.

In addition, as a condition for calculating the second engine torque variation, the torque compensation unit 112 may be configured to determine the lambda error amount in advance and then determine the EGR error amount under the specific condition. In a section C on the graph in FIG. 6, the difference between the EGR target value and the EGR actual value is minimal and the EGR error amount is equal to or less than the fourth reference value. In this section, the torque compensation unit 112 does not calculate the second engine torque variation.

In comparison, in a section D, the difference between the EGR target value and the EGR actual value is substantial and the EGR error amount is greater than the fourth reference value. In this section, the torque compensation unit 112 may be configured to calculate the second engine torque variation. The calculated second engine torque variation compensates the initial limitation of part load mode engine torque by the controller 110 along with the first engine torque variation calculated in advance.

Figure 7:
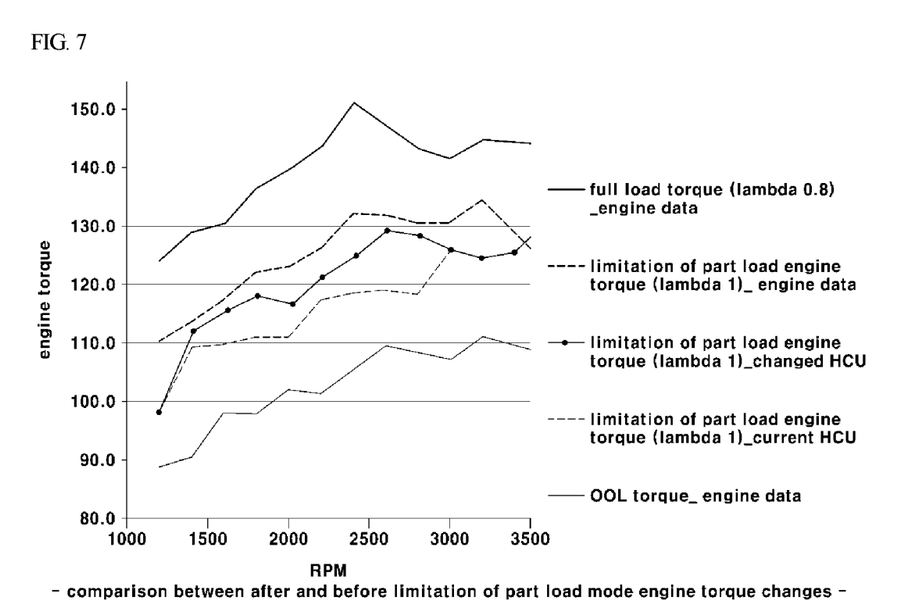
FIG. 7 is a graph comparing limitations of part load mode engine torque before and after compensation is performed according to the exemplary embodiment of the present invention.

FIG. 7 is a graph showing changes in the limitation of part load mode engine torque after compensation by the first engine torque variation and the second engine torque variation is performed. As shown in the drawing, at the top of the graph, a limitation of full load engine torque is shown over the engine RPM, and at the bottom thereof, a torque graph of the optimum operation line (OOP) is shown.

Comparing the initial limitation of part load mode engine torque with the compensated limitation of part load mode engine torque, it is shown that the limitation of part load mode engine torque is upwardly compensated in a section between 1500 RPM and 3000 RPM. In other words, in the section between 1500 RPM and 3000 RPM, the battery SOC is less than the first reference value and the driving energy per unit distance is greater than the second reference value, and thus, the limitation of part load mode engine torque may beset based on the traveling environment increased by the first engine torque variation.

Particularly, the first engine torque variation may be calculated in the section between 1500 RPM and 3000 RPM, and the second engine torque variation may be calculated in a section between 2000 RPM and 2500 RPM, and thus, a section in which the difference between the initial limitation of part load mode engine torque and the compensated limitation of part load mode engine torque becomes small is included. When interpreting the graph, the first engine torque variation may be calculated in the section between 1500 RPM and 3000 RPM based on the state information of the battery 340, and the second engine torque variation may be calculated in the section between 2000 RPM and 2500 RPM based on the engine error amount. Therefore, the limitation of part load mode engine torque may be compensated based on the calculated first and second engine torque variations.

Figure 8:
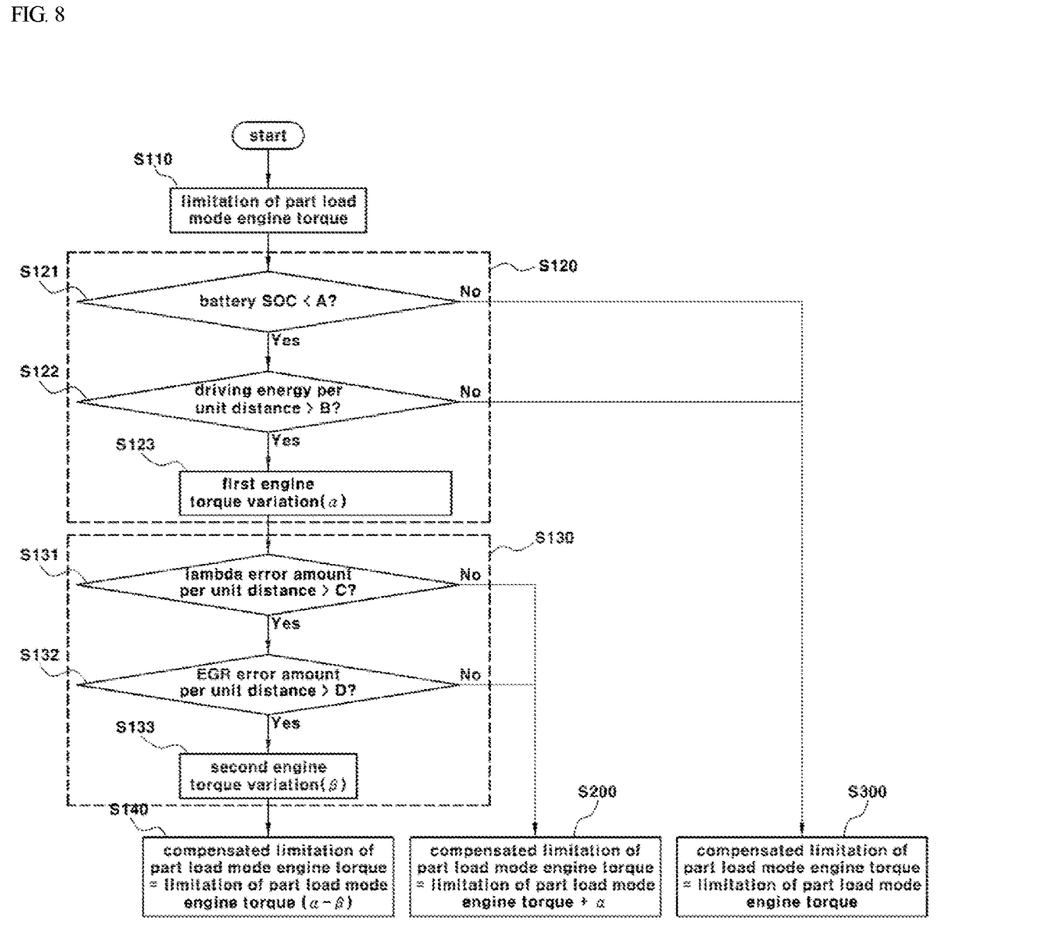
FIG. 8 is a flowchart showing a method of controlling part load mode engine torque according to the exemplary embodiment of the present invention.

FIG. 8 is a flowchart showing the method of controlling part load mode engine torque according to the exemplary embodiment of the present invention. In driving of the engine 310 at the part load mode, the method may include: setting, by the demand torque calculation unit 111, the limitation of part load mode engine torque based on actual traveling environment when the vehicle is being driven (S110); and calculating, by the torque compensation unit 112, the first engine torque variation by receiving the state information of the battery 340 (S120).

In calculating the first engine torque variation based on the state information of the battery 340 (S120), the controller may be configured to determine whether the battery SOC is less than the first reference value A in advance (S121), and when the battery SOC is less than the first reference value A, the controller may be configured to determine whether the driving energy per unit distance is greater than the second reference value B (S122). When the battery SOC is greater than the first reference value A and the driving energy per unit distance is greater than the second reference value B, the torque compensation unit 112 may be configured to calculate the first engine torque variation (S123).

However, when the battery SOC is equal to or greater than the first reference value or the driving energy per unit distance is equal to or less than the second reference value, the torque compensation unit 112 may be configured to set the limitation of part load mode engine torque capable of driving the engine 310 based on actual traveling environment (S300). After the first engine torque variation is calculated (S123), the torque compensation unit 112 may be configured to calculate the second engine torque variation based on the engine error amount (S130).

Additionally, in calculating the second engine torque variation based on the measured engine error amount (S130), the torque compensation unit 112 may be configured to determine whether the lambda error amount per unit distance is greater than the third reference value C (S131), and when the lambda error amount per unit distance is greater than the third reference value C (S131), the torque compensation unit 112 may be configured to determine whether the absolute value of the EGR error amount per unit distance is greater than the fourth reference value D (S132).

When the lambda error amount is greater than the third reference value C (S131) and the absolute value of the EGR error amount per unit distance is greater than the fourth reference value D (S132), the torque compensation unit 112 may be configured to calculate the second engine torque variation (S133). When the absolute value of the lambda error amount per unit distance is equal to or less than the third reference value C (S131) or the absolute value of the EGR error amount per unit distance is equal to or less than the fourth reference value D (S132), the torque compensation unit 112 may be configured to compensate for the limitation of part load mode engine torque by the first engine torque variation (S200).

As disclosed above, the controller 110 of the present invention may be configured to determine whether the first engine torque variation exists, based on the state information of the battery 340, and when the first engine torque variation is calculated, the controller 110 may be configured to determine a calculating condition of the second engine torque variation. The torque compensation unit 112 may be configured to perform the compensation for the limitation of part load mode engine torque set based on the traveling environment, using the first engine torque variation and the second engine torque variation calculated in S123 and S133 (S140), and then logic may be completed.

Although an exemplary embodiment of the present invention has been described for illustrative purposes and the contents described above has been described for illustrating the exemplary embodiment, the present invention may be used in various combinations, modifications, and environment. In other words, those skilled in the art will appreciate that various modifications, additions and substitutions are possible, without departing from the scope and spirit of the invention as disclosed in the specification. The exemplary embodiment described above has been described for illustrating the best mode for realizing the technical spirit of the present invention, and the exemplary embodiment may be variously modified in many different forms required in the specific application area and use of the present invention. Therefore, the detailed description of the present invention is the disclosed exemplary embodiment, but is not intended to limit the present invention. In addition, accompanying claims should be interpreted as including other exemplary embodiments.

What is claimed is:

1. A method of controlling part load mode engine torque, comprising:
   setting, by a controller, a limitation of part load mode engine torque based on a current traveling environment;
   calculating, by the controller, a first engine torque variation based on state information of a battery;
   when the first engine torque variation is calculated, calculating, by the controller, a second engine torque variation based on a measured engine error amount; and
   compensating, by the controller, the limitation of part load mode engine torque based on the calculated first and second engine torque variations.

2. The method of claim 1, wherein the calculating of the first engine torque variation includes:
   determining, by the controller, whether a battery state of charge (SOC) is less than a first reference value;
   when the battery SOC is less than the first reference value, determining, by the controller, whether driving energy per unit distance is greater than a second reference value; and
   when the driving energy per unit distance is greater than the second reference value, calculating, by the controller, the first engine torque variation corresponding to the state information of the battery.

3. The method of claim 2, further comprising:
   when the battery SOC is equal to or greater than the first reference value or the driving energy per unit distance is equal to or less than the second reference value, setting, by the controller, the limitation of part load mode engine torque based on the current driving environment.

4. The method of claim 1, wherein the calculating of the second engine torque variation includes:
   determining, by the controller, whether an absolute value of a lambda error amount per unit distance is greater than a third reference value;
   when the absolute value of the lambda error amount per unit distance is greater than the third reference value, determining, by the controller, whether an absolute value of an exhaust gas recirculation (EGR) error amount per unit distance is greater than a fourth reference value; and
   when the absolute value of the EGR error amount per unit distance is greater than the fourth reference value, calculating, by the controller, the second engine torque variation, based on the engine error amount.

5. The method of claim 4, further comprising:
when the absolute value of the lambda error amount per unit distance is equal to or less than the third reference value or the absolute value of the EGR error amount per unit distance is equal to or less than the fourth reference value, compensating, by the controller, for the limitation of part load mode engine torque by the first engine torque variation.

6. The method of claim 1, wherein the limitation of part load mode engine torque is set by considering at least one factor selected from the group consisting of: engine knocking, an air intake temperature, an atmospheric pressure condition, and an oil temperature as the driving environment.

7. The method of claim 1, wherein the state information of the battery includes information which is measured through at least one selected from the group consisting of: a battery state of charge (SOC), an accumulation amount of a battery current value, and driving energy per unit distance.

8. An apparatus for controlling part load mode engine torque for a hybrid vehicle, comprising:
a demand torque calculation unit configured to calculate a limitation of part load mode engine torque, based on a vehicle driving environment;
a torque compensation unit configured to compensate the limitation of part load mode engine torque by calculating a first engine torque variation based on state information of a battery and calculate a second engine torque variation based on an engine error amount; and
an engine controller configured to set the limitation of part load mode engine torque compensated based on the calculated first and second torque variations as a limitation of engine drive torque to drive an engine of the vehicle.

9. The apparatus of claim 8, wherein, when a battery state of charge (SOC) is less than a first reference value and driving energy per unit distance is greater than a second reference value, the torque compensation unit is configured to calculate the first engine torque variation.

10. The apparatus of claim 8, wherein the engine error amount includes at least one of a lambda error amount and an exhaust gas recirculation (EGR) error amount.

11. The apparatus of claim 10, wherein when the lambda error amount is greater than a third reference value and the EGR error amount is greater than a fourth reference value, the torque compensation unit is configured to calculate the second engine torque variation.

12. The apparatus of claim 11, wherein when the lambda error amount is equal to or less than the third reference value or the EGR error amount is equal to or less than the fourth reference value, the torque compensation unit is configured to compensate for the limitation of part load mode engine torque by the first engine torque variation.

13. The apparatus of claim 8, wherein the state information of the battery includes information which is measured using at least one of a battery state of charge (SOC), an accumulation amount of a battery current value, and driving energy per unit distance.

14. The apparatus of claim 8, wherein the vehicle driving environment includes at least one factor selected from the group consisting of: engine knocking, an air intake temperature, an atmospheric pressure condition, and an oil temperature.

* * * * *